(12) United States Patent
Johnson, Jr.

(10) Patent No.: US 9,315,879 B2
(45) Date of Patent: Apr. 19, 2016

(54) SYSTEM AND METHOD FOR RECOVERING PRECIOUS METALS FROM PRECURSOR-TYPE ORE MATERIALS

(71) Applicant: Alvin C. Johnson, Jr., Scottsdale, AZ (US)

(72) Inventor: Alvin C. Johnson, Jr., Scottsdale, AZ (US)

(73) Assignees: Alvin C. Johnson, Jr., Scottsdale, AZ (US); Richard Watson, Bonita Springs, FL (US)

(*) Notice: Subject to any disclaimer, the term of this patent is extended or adjusted under 35 U.S.C. 154(b) by 0 days.

(21) Appl. No.: 14/610,213

(22) Filed: Jan. 30, 2015

(65) Prior Publication Data
US 2015/0252445 A1    Sep. 10, 2015

Related U.S. Application Data

(63) Continuation-in-part of application No. 14/261,286, filed on Apr. 24, 2014.

(60) Provisional application No. 61/949,174, filed on Mar. 6, 2014.

(51) Int. Cl.

| | |
|---|---|
| *C22B 3/20* | (2006.01) |
| *C22B 11/00* | (2006.01) |
| *C22B 1/16* | (2006.01) |
| *C22B 1/00* | (2006.01) |
| *C22B 3/00* | (2006.01) |
| *C22B 1/26* | (2006.01) |
| *C22B 7/00* | (2006.01) |
| *C22B 11/10* | (2006.01) |

(52) U.S. Cl.
CPC ............... *C22B 11/044* (2013.01); *C22B 1/16* (2013.01); *C22B 1/26* (2013.01); *C22B 3/20* (2013.01); *C22B 7/006* (2013.01); *C22B 11/04* (2013.01); *C22B 11/10* (2013.01); *Y02P 10/214* (2015.11); *Y02P 10/234* (2015.11)

(58) Field of Classification Search
CPC ............ C22B 3/20; C22B 11/04; C22B 1/16; C22B 1/00
See application file for complete search history.

(56) References Cited

U.S. PATENT DOCUMENTS

| 4,211,644 A * | 7/1980 | Wiechers ............... B03D 1/008 |
| | | 209/166 |
| 2009/0074607 A1* | 3/2009 | Hillier .................... B03D 1/02 |
| | | 420/501 |
| 2013/0313483 A1* | 11/2013 | Mace ...................... B03B 5/28 |
| | | 252/408.1 |

FOREIGN PATENT DOCUMENTS

WO    WO 0233134 A2 *    4/2002    ............... C22B 1/00

* cited by examiner

*Primary Examiner* — George Wyszomierski
*Assistant Examiner* — Tima M McGuthry Banks
(74) *Attorney, Agent, or Firm* — Quarles & Brady LLP

(57) ABSTRACT

The present invention provides a system and method for recovering a precious metal from a geologic material. The system and method may include combining a geologic material containing a precious metal present in a non-bulk state with a first stage flux composition. The combination may be milled to provide a first stage mixture. The first stage mixture may be sintered for a first period of time at a first temperature and a second period of time at a second temperature. The second temperature may be greater than the first temperature. Sintering may promote the transition of a portion of the precious metal from a non-bulk state to a bulk state. A first stage sintered material may be recovered with a content of at least about 0.15 weight percent of the precious metal in the bulk state.

19 Claims, 3 Drawing Sheets

SYSTEM AND METHOD FOR RECOVERING PRECIOUS METALS FROM PRECURSOR-TYPE ORE MATERIALS

CROSS-REFERENCE TO RELATED APPLICATIONS

This application is a continuation-in-part of prior U.S. application Ser. No. 14/261,286, filed Apr. 24, 2014, which claims the benefit of U.S. Provisional Application No. 61/949,174, filed Mar. 6, 2014, each of which is incorporated herein by reference.

STATEMENT REGARDING FEDERALLY SPONSORED RESEARCH

Not applicable.

BACKGROUND OF THE INVENTION

The disclosure relates, in general, to the recovery of a target material from a geologic composition and, more particularly, to a system and method for the recovery of precious metals from a precursor type ore.

Gold (Au) is one of the most highly sought after elements mined from the earth and is used as currency, in commercial settings (e.g., jewelry, arts and crafts), and in industrial settings (e.g., electronics, medicine, optics). At standard conditions, gold exists as a solid, generally non-reactive chemical element. Gold can be found in nature as nuggets or grains, in rocks, in veins, in alluvial deposits, and in minerals as gold compounds.

Existing techniques for mining of gold ore can be economical with material containing as little as 0.5 ppm gold even though at this concentration, the gold may be invisible to the naked eye. Various concentrating techniques include leaching such as with an aqueous solution of cyanide to form a water soluble coordination complex according to the following reaction:

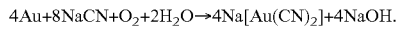

$$4Au+8NaCN+O_2+2H_2O \rightarrow 4Na[Au(CN)_2]+4NaOH.$$

The gold can then be separated from the cyanide solution and the cyanide remediated to ammonia. More refractory gold containing ore may be subjected to various pretreatments including the application of heat, microbes, pressure, or mechanical grinding.

More recently, it has been discovered that various geologic materials may contain gold in a state that is undetectable using traditional analytical techniques such as inductively coupled plasma, atomic absorption spectroscopy, and fire assays/cupellation, the last of which is an accepted standard for valuing gold ore.

As described by van Deventer (*Minerals Engineering* 2013, vol. 53, pp. 266-275), a number of studies exist where fire assays were conducted on geologic materials such as mine tailings (i.e., gangue—the leftover ore material after separation from the valuable fraction of the ore), coal combustion products or CCPs (e.g., fly ash, flue-gas desulfurization materials, bottom ash, boiler slag) and other precursor-type ore materials. Generally, fire assaying such materials indicates that the samples contain an infinitesimal or undetectable amount of gold. In one study, Seredin et al. reported gold concentrations on the order of about 100 parts per billion (0.00001 wt %) in fly ash (*Mineralium Deposita* 2014, vol. 49, pp. 1-6). In another study, a fire assay was only able to identify about 0.01 ppm gold. However, after various treatment steps, it was possible to recover nearly 70 ppm gold from the sample. These results show that fire assay is an inaccurate and ineffective technique for determining the gold content of such geologic materials.

One possible explanation for the ineffectiveness of the aforementioned analysis techniques is that the gold may exist in a non-bulk physical state. It is well known that bulk materials tend to have a particular set of physical and chemical properties. In one aspect, the properties of bulk change as the scale decreases and the fraction of atoms at the surface of a material becomes significant. Thus, when atomic and nanoscale particles are isolated from the bulk material, the physical and chemical behavior of these particles can deviate. For example, gold nanoparticles are capable of forming colloidal suspensions as solvent-surface interactions overcome differences in density. Moreover, colloidal suspensions of submicron-sized gold particles can range in appearance from red to blue to purple depending on the particle size. Therefore, if the gold particles are present in the geologic material in a non-bulk physical state, it may not be possible to perform an accurate determination of the gold content of a sample using standard analytical techniques.

Given the commercial and industrial value of gold and the potential that there may be significant quantities of the element present in geologic materials including mine tailings and CCPs, it may be beneficial to recover the gold and other precious metals from these geologic materials. However, given that the precious metals may be present in a non-bulk physical state which is not amenable to traditional analytical techniques, there is a need for a system and a method to transform the precious metals into a bulk physical state so that they may be accurately detected and recovered in an economical fashion.

SUMMARY OF THE INVENTION

The present invention overcomes the aforementioned drawbacks by providing a system and method for the detection and recovery of gold in a non-bulk physical state. In accordance with one aspect of the present disclosure, a method is provided for recovering a precious metal from a geologic material. The method includes the steps of combining a geologic material including at least one precious metal in a non-bulk state with a first stage flux composition to form a first combination. The method further includes milling the first combination to provide a first stage mixture, and sintering the first stage mixture according to a first sintering profile. The first sintering profile causes a portion of the precious metal to agglomerate within the first stage mixture into a bulk state of the precious metal, the at least one precious metal having in the bulk state a greater weight percent of the first stage mixture than the at least one precious metal had prior to sintering the first stage mixture.

In one aspect, a first stage sintered material includes at least about 0.15 weight percent of the at least one precious metal in the bulk state. In another aspect, the at least one precious metal is selected from gold, silver and platinum group metals. A portion of the at least one precious metal is present as atomic clusters bonded to amorphous colloidal silica. In still another aspect, the first stage flux composition and the one or more sintering profiles are selected to separate the atomic clusters from the amorphous colloidal silica. In yet another aspect, the geologic material is selected from mine tailings and coal combustion products.

In one aspect, the first stage flux composition includes at least one of sodium tetraborate, calcium fluoride, lead oxide, and activated carbon. In another aspect, the first combination comprises about 25 to about 75 weight percent of the geologic material, about 25 to about 75 weight percent of the first stage flux composition and about 0 to about 10 weight percent of a seed material. In yet another aspect, the seed material includes one of gold powder and gold ore. In still another aspect, the first sintering profile includes a first period of time at a first temperature and a second period of time at a second temperature. The second temperature is greater than the first temperature. In a further aspect, the first temperature is at least about 500 degrees Celsius, and wherein the second temperature is at least about 600 degrees Celsius.

In some embodiments, the method includes combining into a second combination the first stage sintered material and a second stage flux composition. The method further includes milling the second combination to provide a second stage mixture, and sintering the second stage mixture according to a second sintering profile. The second sintering profile causes a portion of the at least one precious metal to agglomerate within the second stage mixture, the at least one precious metal having a greater weight percent of the second stage mixture than the at least one precious metal had prior to sintering the second stage mixture. The method may include recovering a second stage sintered material including at least about 1 weight percent of the at least one precious metal.

In one aspect, the second stage flux composition includes at least one of sodium tetraborate, calcium fluoride, lead oxide, and activated carbon. In another aspect, the second combination comprises about 65 to about 95 weight percent of the first stage sintered material, about 5 to about 35 weight percent of the second stage flux composition and about 0 to about 10 weight percent of a seed material. In yet another aspect, the seed material includes one of gold powder and gold ore.

In accordance with another aspect of the present disclosure, a method is provided for recovering a precious metal from a geologic material. The method includes combining into a first combination about 25 to about 75 weight percent of a geologic material including gold present in a non-bulk state, about 25 to about 75 weight percent of a first stage flux composition, and about 0 to about 10 weight percent of gold ore. The method further includes milling the first combination to provide a first stage mixture, and sintering the first stage mixture for a first period of time at a first temperature, a second period of time at a second temperature, and a third period of time at a third temperature. The second temperature is greater than the first temperature, and the third temperature is greater than the second temperature. The method further includes recovering a first stage sintered material including at least about 0.15 weight percent of gold metal transitioned during sintering from a non-bulk state to a bulk state.

In one aspect, the geologic material is selected from mine tailings and coal combustion products. In another aspect, the first stage flux composition includes calcium fluoride and at least one of sodium tetraborate, lead oxide, and activated carbon.

In yet another aspect, the method includes combining about 65 to about 95 weight percent of the first stage sintered material, about 5 to about 35 weight percent of a second stage flux composition, and about 0 to about 10 weight percent of gold ore. The method further includes milling the combination including the first stage sintered material to provide a second stage mixture, sintering the second stage mixture as in the case of the first stage mixture, and recovering a second stage sintered material including at least about 1 weight percent of gold metal transitioned during the sintering steps from the non-bulk state to the bulk state. In one aspect, the second stage flux composition includes calcium fluoride and at least one of sodium tetraborate, lead oxide, and activated carbon.

In accordance with another aspect of the present disclosure, a method is provided for recovering a precious metal from a geologic material. The method includes forming a slurry including a geologic material including at least one precious metal, the at least one precious metal being present in a non-bulk state, and a surfactant. The method further includes agitating the slurry, recovering a solid fraction from the agitated slurry, and sintering the solid fraction according to a first sintering profile that causes a portion of the at least one precious metal to agglomerate within the solid fraction into a bulk state of the at least one precious metal, the at least one precious metal having in the bulk state a greater weight percent of the solid fraction than the at least one precious metal had prior to sintering the solid fraction.

The slurry may include urea. The urea is added to the slurry to provide a final concentration of about 1 gram per liter to 100 grams per liter. The precious metal may be selected from gold, silver and platinum group metals. A portion of the precious metal may be present as atomic clusters bonded to amorphous colloidal silica, and the composition of the slurry and the first sintering profile may be selected to separate the atomic clusters from the amorphous colloidal silica. The geologic material may be selected from mine tailings and coal combustion products. The surfactant may be added to the slurry to a final concentration of about 0.01% to about 1% on a volume per volume basis. The slurry may comprise about 50 g of the geologic material per 1 liter of water. The first sintering profile may include a first period of time at a first temperature and a second period of time at a second temperature, wherein the second temperature is greater than the first temperature. The first temperature may be at least about 260 degrees Celsius, and the second temperature may be at least about 680 degrees Celsius. The method may further include washing the geologic material prior to forming the slurry. The surfactant may be polyethylene glycol p-(1,1,3,3-tetramethylbutyl)-phenyl ether.

In accordance with another aspect of the present disclosure, a method is provided for recovering gold from a geologic material. The method includes combining, into a first slurry, a geologic material including gold present in a non-bulk state, and about 1 liter of water per 50 grams of the geologic material. The method further includes agitating the first slurry, recovering a first solid fraction from the first slurry, and combining, into a second slurry, the first solid fraction, about 1 liter of water per 50 g of the geologic material, about 1 gram per liter to about 100 grams per liter of urea, and about 0.01% to about 1% of a non-ionic surfactant on a volume per volume basis. The method further includes agitating the second slurry, recovering a second solid fraction from the second slurry, sintering the second solid fraction for a first period of time at a first temperature, a second period of time at a second temperature, and a third period of time at a third temperature, wherein the second temperature is greater than the first temperature, and the third temperature is greater than the second temperature and recovering a sintered material including at least about 0.15 weight percent of gold metal in a bulk state.

The geologic material may be selected from mine tailings and coal combustion products. The second slurry may comprise about 10 grams per liter of urea. The second slurry may comprise about 0.1% of the surfactant on a volume per volume basis. The first temperature may be at least about 260 degrees Celsius, and the second temperature may be at least about 680 degrees Celsius, and the third temperature may be at least about 1090 degrees Celsius. The surfactant may be polyethylene glycol p-(1,1,3,3-tetramethylbutyl)-phenyl ether. The method may further include a step of mechanically attriting the sintered material.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Figure 1:
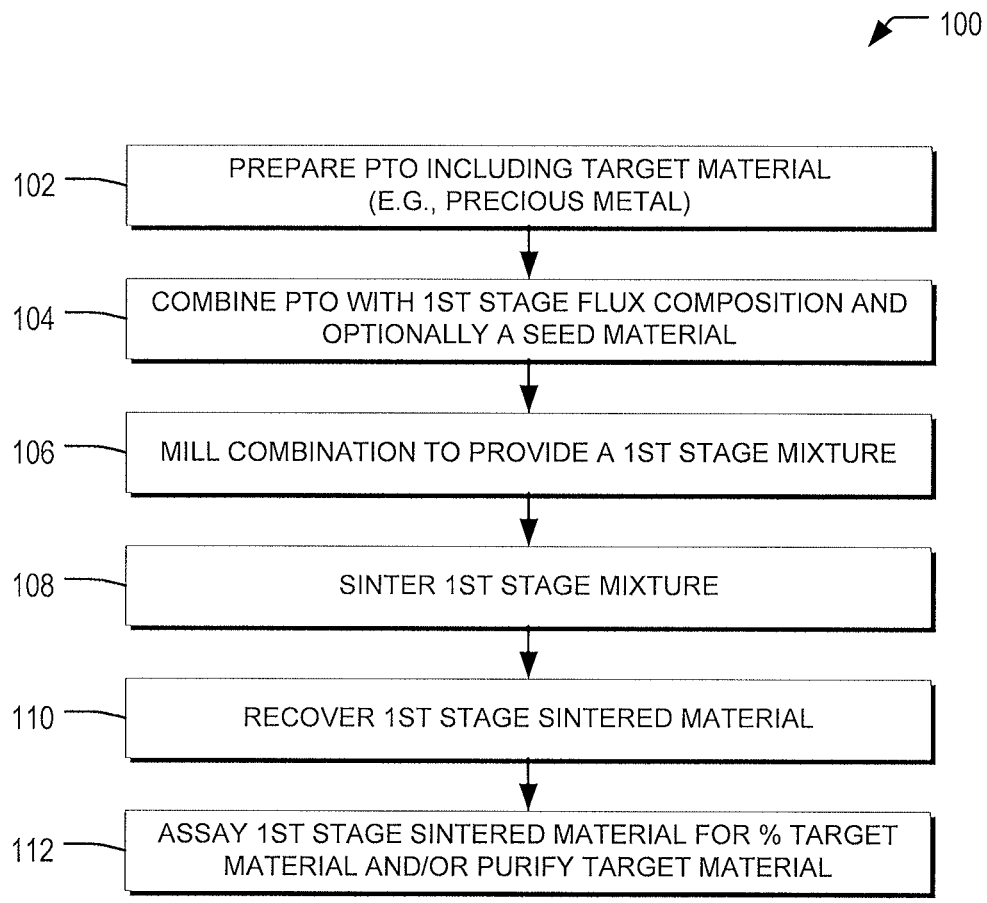
FIG. 1 is schematic flow chart illustrating an example method for recovering precious metals from precursor-type ore materials.

The present invention is presented in several varying embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the system. One skilled in the relevant art will recognize, however, that the system and method may both be practiced without one or more of the specific details, or with other methods, components, materials, and so forth. In other instances, well-known structures, materials, or operations are not shown or described in detail to avoid obscuring aspects of the invention.

In general, one aspect of the present disclosure includes a system and method for recovering a target material from a composition containing the target material. Accordingly, in some embodiments, precious metals such as gold, silver and platinum group metals may be recovered from a precursor-type ore (PTO). A PTO may be understood as a geologic material containing a substantial amount of naturally formed precious metal elements existing in a non-bulk state. A non-bulk state may be understood as a particle existing in a physical or chemical state where the behavior of the particle is characteristically different from that of the behavior of the bulk material (i.e., the bulk state). In one aspect, the particle size or composition may influence whether the particle is in a non-bulk state. For example, whereas bulk quantities of gold have a characteristic yellow color, a solution of monodisperse colloidal gold particles with a particle size of about 100 nm will exhibit a red color with a peak emission wavelength of about 572 nm. A non-bulk state may also include single element atomic clusters bonded to amorphous colloidal silica present in a PTO. Examples of PTO materials can include CCPs, mine tailings, and the like.

In the present disclosure, one or more steps, methods or techniques may refer to a specific example process such as the recovery of gold from fly ash. While one particular element or PTO may be referred to, the present disclosure is applicable to the recovery a number of precious metals from a variety of materials where these metals may be present in a non-bulk state. Therefore, the examples described herein are included by way of illustration and are not meant to limit the scope of the present disclosure.

One aspect of a method according to the present disclosure may include providing a PTO material. The PTO may be a geologic material including at least one precious metal present in a non-bulk state. In some embodiments, the PTO may be prepared with a given average particle size or distribution. Accordingly, a given particle size may be prepared through the use of a standard mesh or sieve series.

Sieve sizes are generally regulated by standards, such as international standards ISO 565:1990 and ISO 3310-1:2000, European standard EN 933-1, and U.S. standard ASTM E11:01. In the United States, particle sizes may be classified using the U.S. Sieve Series as well as the Tyler Standard Sieve Series. With respect to U.S. standard mesh sizes, increasing mesh number generally correspond with decreasing particles sizes. For example, a U.S. No. 200 mesh is equivalent to a 200 Tyler mesh is equivalent to a 0.074 mm (0.0029 inches) opening, whereas a U.S. No. 325 mesh is equivalent to a 325 Tyler mesh is equivalent to a 0.044 mm (0.0017 inches) opening.

In some embodiments, the PTO may be prepared with a particle size according to a minimum U.S. mesh size of about 200 to about 300. Consequently, the maximum particle size of the PTO material may be about 50 µm to about 75 µm. Other PTO particle sizes may also be used. For example, a given starting particle size may be chosen based on a method selected for combining or milling the PTO with another material in a subsequent process.

In some embodiments of the present disclosure, the PTO material may be combined with a flux composition. A flux composition may include one or more components, such as a flowing agent, an oxidizing agent, a reducing agent or a purifying agent. Example flux compositions may include carbonate of soda, potash, charcoal, coke, borax, lime, lead sulfide and phosphorus compounds. Still other flux compositions may include inorganic chlorides, fluorides, limestone, litharge, activated carbon and other like materials. Still other flux compositions may include ionic salts, such as potassium nitrate, in a weight of up to 100% of the flux composition. In one aspect, the components of the flux composition may act as reducing agents to prevent oxide formation. In another aspect, components of the flux composition may act to selectively partition impurities away from the precious metal or other target material or add desirable elements to the target material.

A PTO may be combined with a flux composition in any suitable ratio. For example, a given amount of a PTO may be combined with a greater, smaller or equivalent amount of a flux composition in order to recover a target material from the PTO. In some embodiments, the combination may include about 25 to about 75 weight percent of the PTO or geologic material, and about 25 to about 75 weight percent of the flux composition. Several combinations including a PTO and a flux composition are described in the Examples provided herein. However, maximum recovery of a target material from some PTOs may require an adjustment of the percentage of individual components of a flux composition as well as the total amount of the flux composition combined with a PTO.

Another aspect of a system and method according to the present disclosure may include a milling step in order to grind or mix the PTO with a flux composition. One objective of a milling step may be to provide a generally homogeneous mixture of the combined PTO and flux composition. A generally homogeneous mixture may be visibly uniform in color or particle size. However, it may not be necessary that the product of a milling step is completely homogeneous. For example, a PTO and flux composition may be milled such that the flux composition has a larger, smaller or otherwise varied particle size and distribution in comparison with that of the PTO. Moreover, the portions of the flux composition may be visually distinguished from the PTO after completion of a milling step, such as by a perceptible color, shape, or size difference.

In some embodiments, a milling step may be carried out with a ceramic mortar and pestle in order to prepare a sample combination including a PTO with a flux composition. The sample may be ground to the point where it has a homogeneous or uniform color. In other embodiments, a suitable sized ball mill with ceramic balls may be used to mill a sample combination. Other homogenization methods may also be used in a milling step according to the present disclosure. Example methods may include ball milling, roller milling, hammer milling, and the like.

In one aspect, two or more milled samples may be combined. For example, a first milled combination of a PTO and a flux composition may be combined with a second milled combination of a PTO and a flux composition. The first combination and second combination may have generally the same overall composition or the combinations may have different compositions. In one example, fly ash may be combined with a borax-based flux composition in a first milling process, while mine tailings may be combined with a litharge-based flux in a second milling process. Afterwards, the products of the first and second milling processes may be combined and optionally exposed to another milling or mixing step. In another example, a PTO material may be milled separately from a flux composition with the separately milled products combined in a later step. In still other examples, two or more sequential milling steps may be carried out to achieve a suitable mixture of a PTO material and a flux composition.

Another aspect of a method according to the present disclosure can include sintering a combination of a PTO material and a flux composition. Generally, sintering may include heating a PTO material at a given temperature for a period of time in order to aid in the recovery of a target material from the PTO. A sintering step may be carried out a various points during a recovery or analysis process. In some embodiments, sintering may include heating of a PTO material alone or in combination with a flux composition. In other embodiments, sintering may be carried out with a combination of a PTO material and flux composition following a milling step as described above. A milled combination may be placed in a container made of a refractory material that is able to withstand the temperatures associated with a sintering step. For example, one possible container may include a fireclay saggar or sintering tray. A milled combination may be placed in a uniform layer within a sintering tray. A milled combination may also be divided between two or more sintering trays. The prepared sintering trays may be placed in a kiln, furnace, oven or other heating apparatus. The sintering trays may remain static within the heating apparatus, or the trays may be made to pass through a heating apparatus such as multi-temperature zone belt furnace. Optionally, the sintering step may take place above atmospheric pressure. In one aspect, a hot isostatic pressing process may be used.

A sintering step may include any suitable sintering temperature profile. In one aspect, a sample such as a milled combination of PTO and a flux composition may be heated from room temperature to a set point temperature and held at the set point temperature for a period of time. A sample may be generally sintered at a set point temperature below the melting point of the sample. However, any set point temperature may be selected. In some embodiments, a sintering profile may include more than one segment. For example, a first segment may include heating a sample to a first set point temperature and holding the sample at that temperature for a first period of time. In a second subsequent segment, a sample may be heated (or cooled) from the first set point temperature to a second set point temperature and held at the second set point temperature for a second period of time. The first and second time periods may have the same duration or a different duration. Additional segments may also be included, such as a final cooling segment during which a sample is returned to ambient conditions. In general, the segments may be programmed with a temperature controller.

In some embodiments, a sintering step may be used to transition at least a portion of the target material into a more readily detectable or recoverable state. For example, a PTO including gold in a non-bulk state may be sintered in the presence of a flux composition to cause the gold to transition from the non-bulk state into a bulk state. That is, a sintering step may be configured to cause a portion of the target material to agglomerate into a bulk state. This transition may involve breaking or forming of chemical or physical bonds. A sintering step may also increase the rate of atomic diffusion in order to encourage coalescence of disparate gold atoms, particles or compounds, thereby yielding larger molecules that may be more readily detectable or recoverable when transitioned into a bulk state.

For sintering steps with a temperature profile including two or more heating segments, one or more of these segments may be configured to promote the initial formation of agglomerated gold clusters. The agglomerated gold clusters may be derived from atomic gold particles attached to amorphous colloidal silica contained within a PTO. Relaxation of bonding between the atomic gold particles and the amorphous colloidal silica may occur due to recrystallization, aurophilic attraction, or another mechanism. In one aspect, it may be possible to recover atomic gold particles from amorphous colloidal silica due to recrystallization of the amorphous colloidal silica to microcrystalline silicon dioxide. A weaker bond strength may exist between atomic gold particles and microcrystalline silicon dioxide as compared with amorphous colloidal silica allowing for the atomic gold particles to be more readily recovered. In another aspect, aurophilic attraction between two or more atomic gold particles, at least one of which is associated with amorphous colloidal silica, may result in the formation of larger agglomerated gold clusters. The formation of larger gold clusters may lead to a weaker bond with the amorphous colloidal silica allowing for the gold clusters to be more readily recovered.

In some embodiments, the resulting agglomerated gold clusters may be below bulk metal in size (i.e., in a non-bulk state) and therefore may not be readily characterized or detected as metallic gold using standard analytical methods. Segments of a temperature profile for initial formation of an agglomerated material may occur at relatively low temperatures. For example, if a sample will be ultimately sintered at a maximum temperature of about 900° C. (1650° F.), then a temperature of about 500° C. (930° F.) may be selected for a segment to enable the initial agglomeration process to occur.

A temperature profile may also include a heating segment configured to promote the continued formation and growth of the agglomerated gold clusters into larger bulk metal clusters or critical size nuclei. The larger bulk metal clusters may then serve as loci for growth into larger particles that may be recovered or characterized as gold metal. Segments of a temperature profile for the formation of larger bulk metal clusters may occur at relatively moderate to high temperatures. For example, if a sample will be ultimately sintered at a maximum temperature of about 900° C. (1650° F.), then temperatures from about 700° C. (1290° F.) to about 900° C. (1650° F.) may be selected for one or more heating segments to promote larger bulk metal cluster formation and ultimately, formation of recoverable or detectable, bulk state precious metals.

A sintering step may include a temperature profile with any number of heating segments. In some embodiments, a temperature profile can include four heating segments with each segment being characterized by holds at progressively higher temperatures. For example, the set point temperatures for each sequential hold may be 500° C. (930° F.), 600° C. (1110° F.), 700° C. (1290° F.) and 900° C. (1650° F.) for heating segments 1-4, respectively. Other temperature profiles may include more or less heating (or cooling) segments. Moreover, subsequent set point temperatures may be relatively higher or lower than a previous set point temperature. That is, the temperature may increase or decrease between each heating segment in order to reach the new set point temperature.

The length of time for which a sample is maintained at the set point temperature once the set point temperature has been reached (i.e., the hold time) may also vary. In some embodiments, the hold time may be between about 5 minutes and about 5 hours. For example, a temperature profile may include segments where each segment includes a hold time of about 90 minutes. In another example, the hold time may vary with a first heating segment having a hold time of about 60 minute, a second heating segment having a hold time of about 120 minutes and subsequent heating segment having a hold time of 30 minutes. Longer or short hold times may be used and in some embodiments, or the hold time may be omitted altogether.

The rate at which the temperature is increased or decreased (i.e., ramped) between set point temperatures may also vary. In some embodiments, it may be desirable to transition between set point temperatures at the maximum ramp rate achievable given the specifications of the selected process equipment. In other embodiments, the ramp rate (degrees per unit time) may be controlled. For example, it may be useful to use a temperature ramp rate (positive or negative) of about 1 to about 25° C. per minute. A controlled ramp rate may be useful for a temperature profiles that may not include one or more intermediate set point temperatures. Moreover, the ramp rate may vary as a function of time or as the temperature profile for the sintering process progresses.

For some PTO materials, a second stage sintering step may further promote the transition of the target material (e.g., gold) from a non-bulk state to a bulk state that may be more readily recovered or characterized. Therefore, a system and method according to the present disclosure may include more than one distinct sintering step. For example, a sample such as a milled combination of PTO and a flux composition may be subjected to a first stage sintering step followed by a second stage sintering step. The first stage sintering step may generally be carried out as described above with a sample being exposed to a complete temperature profile including a cooling step to return the sample to ambient conditions. The product of the first stage sintering step may then be subjected to one or more processing steps such as a combining or milling step as described herein. Following any processing steps, the sample may be subjected to a second stage sintering process including exposure to a second complete temperature profile.

In one aspect, it may be useful for PTO materials run through a first sintering profile to be re-ground to a given mesh size, combined and milled with a second flux composition, and then re-sintered. In particular, the inventor has made the surprising discovery that for a PTO material including gold in a non-bulk state, the product of a milled combination of the PTO and a flux composition might, after a first stage sintering step, be characterized by fire assay as having a gold content of about 50 troy ounces per short ton (about 0.17 wt %). However, after second stage sintering (following milling of the product of the first stage sintering step with an additional amount of a second flux composition), a sample might be characterized by fire assay as having a gold content of about 350 troy ounces per ton (about 1.2 wt %) or a 7-fold increase in detectable gold.

The second flux composition may be the same or different from a first flux composition if a first flux composition was added to the PTO material prior to first stage sintering. The amount of a second stage flux composition combined with the product of a first stage sintering step may also vary with respect to an amount of a first flux composition (if any) combined with the PTO prior to the first stage sintering step. In one aspect, the product of a first stage sintering step may be combined with about 5% to about 50% of a second flux composition by total weight of the product of the first stage sintering step. For example, 20% by weight of a second flux composition may be added. Accordingly, for a product of a first stage sintering step weighing 10 kg, 2 kg of a second flux composition may be combined with the product. As described above, this second combination may be subjected to milling, for example, to generally homogenize the combination prior to a second stage sintering step.

As discussed previously, a second stage sintering step may be useful to increase the amount of target material that may be recovered or detected by several fold. One possible explanation for this detected increase may be related to the effect of agglomerated particles or metal clusters acting as nucleation sites. In the example case of gold containing PTO milled with a first flux composition, nucleation sites or "seeds" in the form of non-bulk state gold particles may be present after completion of a first stage sintering step. However, it is possible that the rate of nucleation or grain growth diminishes as portions of the flux composition, which may promote mobility of the gold, react and combine with the components of the PTO. One result may be that the sample undergoing sintering is less viscous and the gold particles less mobile. The net effect may be to slow the rate of nucleation and possibly leave a portion of the gold particles in a non-bulk state that may not be readily recovered or detected. Accordingly, recovery of additional target material may be realized with a second stage sintering step including an additional portion of a second flux composition.

Additional or alternative processing steps may also be included in a system and method according to the present disclosure. For example, in addition or as an alternative to a flux composition, a seed material may be combined and milled with a PTO material. In one aspect about 0% to about 10% of a seed material may be combined with a PTO material. For example, for the recovery of gold from a PTO sample, about 3% by weight of gold powder may be added to the PTO material. In one aspect, it may be possible to determine whether or not the addition of an amount of a seed material may be able to promote the transition of a target material from a non-bulk state to a bulk state. Accordingly, the addition of a given amount of a seed material may be tested with each new PTO material to determine if the addition of the seed material will have a positive effect on the rate of nucleation and growth of the particles or clusters of the target material. While the seed material may be incorporated at any point in the present system and method, in one aspect, the seed material may be combined with the PTO for milling prior to first stage sintering. In another aspect, the seed material may be combined with the product of a first stage sintering step and milled prior to second stage sintering. Similarly, the seed material may be added before or after a third or subsequent sintering step or omitted altogether. Examples of seed materials can include an ore containing the target material (e.g., gold ore, platinum ore, etc.), pure bulk state particles of the target material (e.g., colloidal gold particles, gold powder), and materials in general that may promote nucleation, particle growth, and transition from the non-bulk state to the bulk state.

In some embodiments of the present system and method, the target material may be characterized, detected, recovered or otherwise assayed. A step of recovering or assaying may occur at any point in a process according to the present disclosure. In one example, a recovering or assaying step may occur following the completion of one or more sintering steps. Accordingly, a product of a first stage or second stage sintered material may be recovered and characterized to determine the content of the target material. The sintered product of a first stage sintering step may be characterized by fire assay as having a detectable amount of the target material, such as at least about 0.15 weight percent gold in a bulk state. If the sintered product is then processed and exposed to a second stage sintering step, the resulting material may be characterized by fire assay as having a higher amount of the target material than first detected, such as a gold content of at least about 1 weight percent gold in a bulk state. Other analytical methods in addition or as an alternative to a fire assay may be used to determine the content of a target material. Moreover, samples may be analyzed at any point when carrying out a system and method according to the present disclosure. Intermittent analysis may be used, for example to obtain one or more quantitative or qualitative measurements, such as mass, density, composition, and the like. Useful techniques may include spectroscopic analysis, chemical assay, physical analysis, and other analytical methods.

In some embodiments, recovered sintered products may be processed to recover the target material using one or more recovery methods. Examples of recovery methods may include liquid extraction with an aqua regia or sodium cyanide treatment, electrochemical extraction or any other suitable technique for recovering target materials such as gold, silver, platinum group metals, and other precious metals in general. In other embodiments, it may be economically viable to sell the target material-bearing sintered material without recovering or purifying the target material. For sintered products including other materials that may be useful to recover in addition to the target material, additional or alternative processing steps may be performed to recover these other materials. For example, when a flux composition includes litharge (i.e., lead oxide), due to the high lead content of the final sinter, it may be useful to recover the lead in addition to the target material.

Referring to FIG. 1 an example method for recovering a target material such as gold or another precious metal from a PTO may include a first stage and optionally a second stage. In general, a first stage for recovering a target material of the method 100 may include a first step 102 in which a PTO including a target material is prepared. Preparation of the target material may include any number of purification, separation, grinding, or other process steps. For example, the PTO may be ground and passed through one or more sieves to obtain a fraction having a maximum particles size. In one aspect, a minimum U.S. standard mesh size of about 200-300 may be used to prepare the PTO material.

Once the PTO has been prepared, a next step 104 in a method 100 may include combining the PTO (e.g., a geologic material including at least one precious metal present in a non-bulk state) with a first stage flux composition. One possible flux composition may include borax and calcium fluoride. However, other a flux composition may include other components as described herein. Optionally, a seed material such as a powdered ore containing the target material may be combined with the PTO.

A next step 106 of the method 100 may include milling the combination of step 104 to provide a first stage mixture. Step 106 may include any suitable milling apparatus, such as a ball mill or mortar and pestle. The first stage mixture may then be sintered in a step 108 of the method 100. One aspect of step 108 may include transitioning a portion of the target material from a non-bulk state to a bulk state. Another aspect of a sintering the first stage mixture may include a temperature profile with one or more heating segments. The sintering temperature profile may cause a portion of the target material (e.g., precious metal) to agglomerate within the first stage mixture. In one example, the first stage mixture may be sintered for a first period of time at a first temperature and a second period of time at a second temperature. The second temperature may be different (e.g., greater) than the first temperature. However, as discussed previously, the temperature profile may include more or less heating segments with varied temperatures and times.

A method 100 may also include a further step 110 of recovering the first stage sintered material. In some embodiments, at least a portion of the target material present in the PTO may have transitioned to a bulk state during the sintering process in step 108. Accordingly, a first stage sintered material may include at least about 0.15 weight percent of the target material in the bulk state.

A method 100 may further include a step 112. One example of a step 112 includes assaying a first, second, or subsequent stage sintered material. Assaying can include a fire assay or another chemical or physical characterization technique. In one aspect, the assay may be used to determine the target material content of the geologic material. While step 112 is illustrated as following step 110, a step of assaying may take place at any point in the method 100 where it might be useful to determine the composition or another property of a PTO sample undergoing processing.

Figure 2:
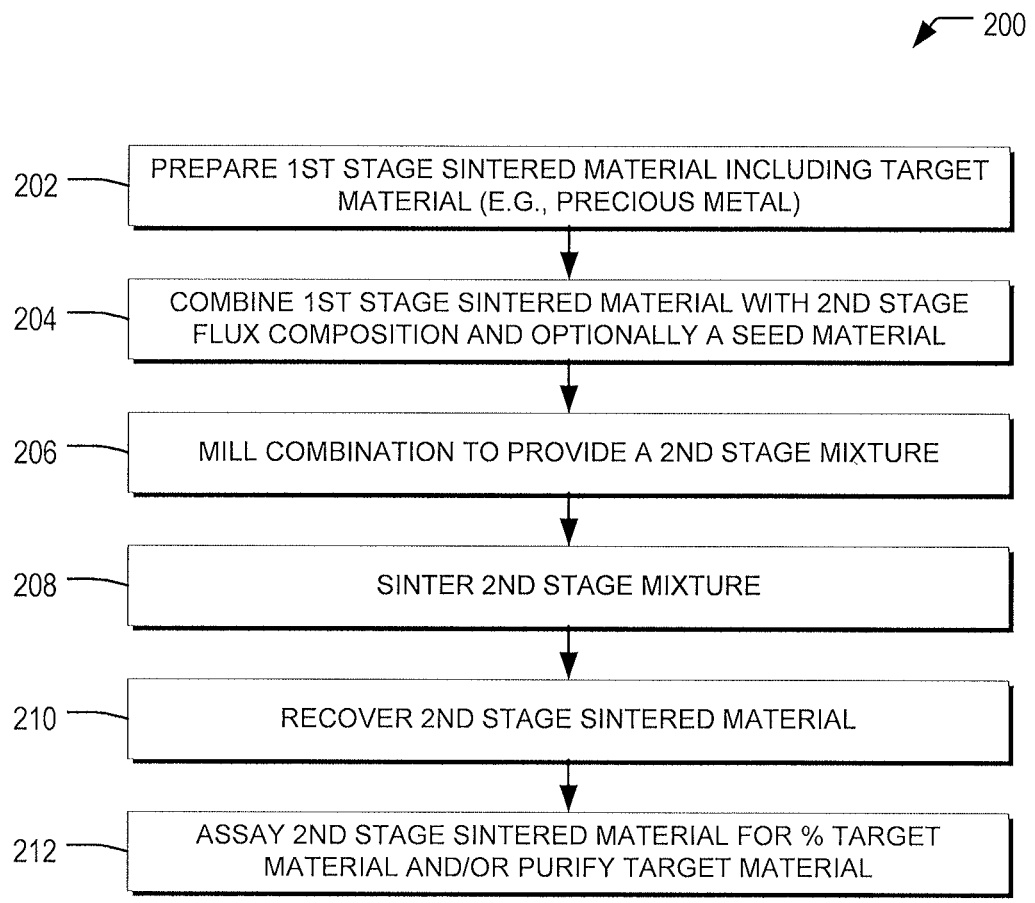
FIG. 2 is a schematic flow chart illustrating another example method for recovering precious metals from precursor-type ore materials.

In some embodiments, the weight percent detected may be improved if the first stage sintered material is subjected to subsequent stages as shown for the method 200 in FIG. 2. Accordingly, a method 200 may include to step 202 in which a first stage sintered material (e.g., prepared by method 100) is prepared for second stage sintering. For example, the first stage sintered material may be prepared in a manner analogous to the preparation of the PTO material as described for step 102 of method 100. Method 200 may continue through the second stage including a step 204 in which the first stage sintered material may be combined with a second stage flux composition and optionally a seed material. The combination of step 204 may be milled to provide a second stage mixture in step 206, sintered in a step 208, and recovered in a step 210. As for step 112 of method 100, method 200 may include a step 212 in which the second stage sintered material is assayed to measure the content or purify the target material.

In some embodiments, a second stage as illustrated in method 200 may differ from a first stage as illustrated in method 100. For example, the first and second flux compositions may differ. The amount of flux added to the first stage sintered material in the second stage may also differ from the amount of flux added to the PTO material in the first stage. Other differences between the first and second stages may include the sintering profile, the milling apparatus, and the use of a seed material. A third, fourth or subsequent stage may also be carried in addition to (or instead of) method 100 and method 200.

In some embodiments, it may be useful to combine a PTO material with urea ($CO(NH_2)_2$), a surfactant, or a combination thereof for the recovery of a target material. In one aspect, the urea and surfactant (either alone or in combination) may facilitate washing or purification of the PTO material. In another aspect, the urea and surfactant (either alone or in combination) may assist in the nucleation, growth and recovery of a target material from the PTO. For example, urea, a surfactant, or a combination thereof may be used to control the pH of a slurry including the PTO, facilitate the dispersion of particles of the PTO in the slurry, or otherwise facilitate the recovery of the target material from the PTO. In one example, urea may be added to a slurry of PTO to a final concentration of about 1 g/L to about 100 g/L. In another example, a surfactant may be added to a slurry of PTO to a final concentration of about 0.01% to about 1% on a volume per volume basis in the case of a liquid surfactant.

Suitable surfactants for use in the recovery of a target material from PTO may include anionic, cationic, amphoteric (zwitterionic) and non-ionic surfactants. Examples of anionic surfactants include alkylbenzene sulfonates, fatty acid soaps, lauryl sulfate, dialkyl sulfosuccinate, lignosulfonates, and the like. Example of cationic surfactants include quaternary alkylammonium compounds, fatty amine salts, linear diamines, aromatic or saturated heterocycles including one or more nitrogen atoms, and the like. Examples of nonionic surfactants include ethoxylated linear alcohols, ethoxylated alkyl phenols, fatty acid esters, amine and amide derivatives, alkylpolyglucosides, ethleneoxide/propyleneoxide copolymers, polyalcohols and ethoxylated polyalcohols, thiols, and the like. Examples of amphoteric surfactants include amino propionic acids, imido propionic acids, quaternized compounds such as betaines, sulfobetaines and taurines, and the like. In some embodiments, it may be useful to provide a polyethylene oxide based non-ionic surfactant such as polyethylene glycol p-(1,1,3,3-tetramethylbutyl)-phenyl ether (i.e., Triton X-100, DOW CHEMICAL CO.).

In one example method including the use of urea and a surfactant, a target material may be recovered from a PTO by first forming a slurry of the PTO in an amount of water (e.g., tap water). In one aspect, the PTO material may be prepared with a U.S. standard mesh size of about 300 mesh, ensuring a PTO particle size of 300 mesh (equivalent to about 50 μm) or smaller. In another aspect, the water may be combined with the PTO at a ratio of about 50 g PTO per liter of water. The slurry may be agitated in any suitable agitation apparatus. Further, it may be useful to maintain a basic pH during agitation. For example, it may be useful to maintain the pH between about 10.5 and about 11.5. The pH may be maintained in any suitable fashion, such as through the addition of a concentrated solution of NaOH. For recovery of the solid fraction of the slurry from the agitation apparatus, the slurry may be allowed to settle for a period of time. Recovery may be further assisted by vacuum filtration or another means of mechanical separation (e.g., filter press). In one aspect, it may not be necessary to completely dry the recovered filter cake (solid fraction) prior to further processing. For example, it may be useful to proceed to a next step in a method for recovering a target material from the PTO even though the filter cake contains water.

Following an initial washing step as described above, it may be useful to add an amount of urea, a surfactant, or a combination thereof to the washed PTO. For example, a filter cake may be resuspended in a volume of water with an amount of urea. In one aspect, the volume of water may be equal to the first amount of water added to the PTO in the washing step (i.e., about 1 liter of water per 50 g PTO). In another aspect, the urea may be added to the slurry to provide a final concentration of about 1 g/L to about 100 g/L. In one particular example, the urea may be added to the slurry to provide a final concentration of about 10 g/L. The urea may be added to the slurry with continuous or intermittent agitation. Alternatively, agitation may be paused during addition of the urea or a portion thereof. The slurry with urea may be agitated for a period of time (e.g., about 1 hour). Further, it may be useful to monitor the pH during agitation. For example, the pH of the slurry may be between about 9 and about 10.

Before or after the addition of urea, it may be useful to add an amount of a surfactant to the slurry. A surfactant may be added to a slurry of PTO to a final concentration of about 0.01% to about 1% on a volume per volume basis. In one example, the surfactant may be added to the slurry to provide a final concentration of about 0.01%. In another example, the surfactant may be the non-ionic surfactant Triton-X 100. Alternatively (or in addition), the surfactant may be another suitable surfactant or combination of surfactants such as one or more of the surfactants described above. The surfactant may be added to the slurry with continuous or intermittent agitation. Alternatively, agitation may be paused during addition of the surfactant or a portion thereof. The slurry with surfactant may be agitated for a suitable period of time (e.g., about 4 hour).

Following agitation in the presence of urea, a surfactant or a combination thereof, the solid fraction may be recovered from the slurry as a filter cake. Further steps may be carried out with the filter cake including a sintering step, a mechanical shearing (attrition) step, or an assaying step to determine the amount of the target material present in the PTO. Further, it may be useful to concentrate an attrited material through gravity concentration. In one aspect, it has been determined that at least a portion of an attrited sample may be concentrated by carefully washing the fines from the coarser metallic particles. In another aspect, it may be useful to concentrate the attrited material with a slimes gravity table, a mineral jig, or the like. By panning, concentrate ratios of approximate 20:1 have been achieved. Further aspects of a method including the treatment of a PTO material with urea, a surfactant, or a combination thereof are described in Examples 8 and 9 below.

Figure 3:
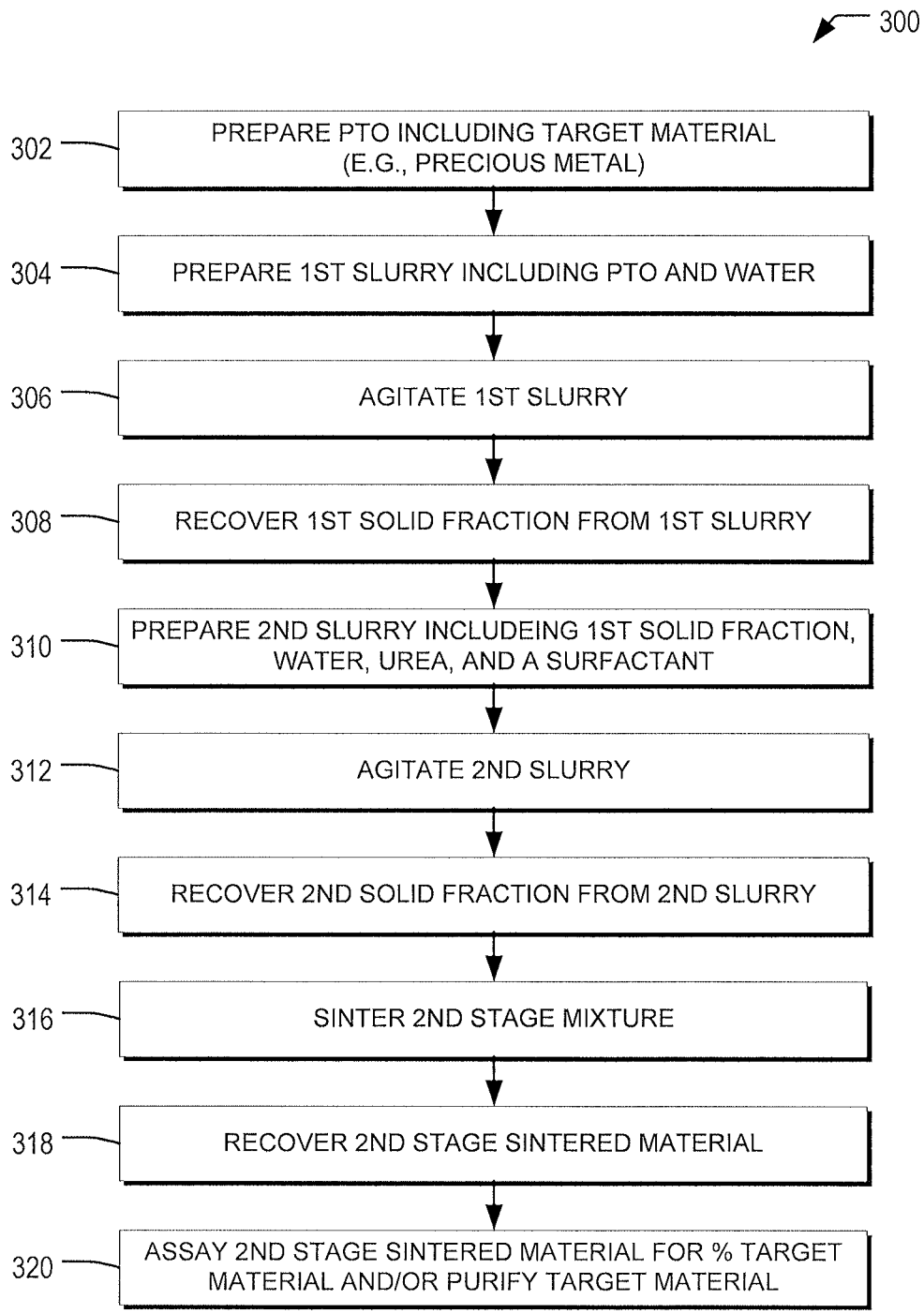
FIG. 3 is a schematic flow chart illustrating yet another example method for recovering precious metals from precursor-type ore materials.

Turning now to FIG. 3, an example method 300 for recovering a target material from a PTO includes a first step 302 of preparing a PTO material. The PTO may be prepared in any suitable fashion as described herein. For example, the PTO material may be ground and sieved to provide a material having a uniform particle size or distribution of particles sizes. A step 304 of the method 300 may include combining the prepared PTO material with water to provide a first slurry. In a next step 306, the first slurry may be agitated to wash the PTO material. A step 308 may then include recovering a first solid fraction of material from the first slurry.

In a next step 310 of the method 300, the first solid fraction may be combined with water, urea and a surfactant to provide a second slurry. The amount of urea, water and the surfactant may vary as described herein. In one aspect, either the urea or the surfactant may be omitted or substituted for another component. Further, the urea and the surfactant may be added simultaneously or sequentially to the solid fraction and the water in the second slurry. A further step 312 may include agitating the second slurry. Agitation may occur before, during, and after addition of the urea and the surfactant to the second slurry. In a next step 314 of the method 300, a second solid fraction may be recovered from the second slurry. Recovery of either the first solid fraction in the step 308 or the second solid fraction in the step 314 may include gravity filtration, vacuum filtration, a filter press, or another suitable method of filtration.

A step 318 of the method 300 may include sintering the second solid fraction. Sintering may include firing of the second solid fraction in a fireclay saggar. The saggar may be placed in an oven, kiln or the like. Further, a temperature program may be used in the step 318. The step 318 may further include a mechanical shearing or attrition step. In this case, the attrited material may be concentrated to provide an attrited sinter for analysis. In a next step 320, the sintered material may be assayed to determine a percent of the target material present in the sintered material. In one aspect, the step 320 may include performing a fire assay. In the case of a fire assay, the sintered material may be combined with a flux composition such as the composition described in Table 8 below.

The schematic flow charts shown in the Figures are generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed in the Figures are provided to explain the logical steps of the method and are understood not to limit the scope of the method. Although various arrow types and line types may be employed, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Example 1

A PTO material containing gold in a non-bulk state was processed in order to recover gold from the PTO material. A 1 kg sample of a PTO material (bottom ash) was combined with a flux composition (Table 1) and divided into five approximate portions.

TABLE 1

| Component | Chemical Formula | Parts | Details |
|---|---|---|---|
| Bottom Ash | n.a. | 100 | 200-300 mesh size (US) |
| Borax Powder | $Na_2B_4O_7 \cdot 5H_2O$ | 60 | 20-40 mesh |
| Calcium Fluoride | $CaF_2$ | 7 | |
| Gold Ore | n.a. | 5 | powdered, optional | n.a. = not applicable

Prior to combining with the flux composition, the PTO was processed to achieve a minimum U.S. standard mesh size of 200 to 300. The flux composition included borax powder and calcium fluoride. In one aspect, the borax may reduce the melting point of minerals present in the PTO, including gold ($T_m$=1063° C.). In another aspect, calcium fluoride may function as an activator to promote the dissolution of metal oxides, among other features.

Each of the five portions was milled with a ceramic mortar and pestle until the color of the combination was generally homogeneous. The five portions were then blended in a plastic bucket using a large plastic spoon and the blend was passed through a small impact mill twice. The mass of all of the PTO material and the flux composition was recorded before and after each of the combining and mixing steps. The combined material was then divided and processed into uniform layers in a number of fireclay saggars (sintering trays). The milled combination was then sintered according to the profile shown in Table 2. Optional heating segment 4 was omitted.

TABLE 2

| Segment | Ramp Rate (° C./hr) | Hold Temp. (° C.) | Hold Time (min) |
|---|---|---|---|
| 0 | n.a. | R.T. | n/a |
| 1 | maximum | 500 | 90 |
| 2 | maximum | 607 | 90 |
| 3 | maximum | 727 | 90 |
| 4* | maximum | 899 | 90 |
| 5 | n.a. | R.T. | n/a |

*optional heating segment; R.T. = room (ambient) temperature; n.a. = not applicable Sintering was carried out in a programmable Super Dragon Kiln manufactured by Paragon Industries, L.P. This kiln had a maximum operating temperature of 1260° C. (2300° F.) with an average maximum ramp rate of about 22° C. (72° F.) per minute. In general, the total ramping time from ambient temperature to 732° C. (1350° F.) for the kiln was approximately 1 hour and the total sintering time for four 90 minute heating segments as in Table 2 was approximately 5 hours and 30 minutes until furnace shut-off.

Heating segments 1 and 2 in Table 2 were configured for the low temperature initial formation of agglomerated gold clusters, while heating segment 3 was configured for the continued formation and growth of these small clusters into larger bulk metal clusters as described above.

For second stage sintering the product of first stage sintering was combined and milled with an additional 20% by weight of a second flux composition composed of only borax powder. The second stage sintering profile was analogous to the first stage sintering profile as described above and shown in Table 2.

Example 2

The flux composition shown in Table 3 was substituted for the flux composition shown in Table 1 and the process of Example 1 was applied. A PTO combined with a flux composition including litharge may also be sintered using a temperature profile as in Table 2 including optional heating segment 4.

TABLE 3

| Component | Chemical Formula | Parts | Details |
|---|---|---|---|
| Geologic Material | n.a. | 100 | 200-300 mesh size (US) |
| Litharge | PbO | 150 | |
| Calcium Fluoride | $CaF_2$ | 7 | |
| Gold Ore | n.a. | 8 | Powdered, optional | n.a. = not applicable

Example 3

The flux composition shown in Table 4 was substituted for the flux composition shown in Table 1 and the process of Example 1 was applied.

TABLE 4

| Component | Chemical Formula | Parts | Details |
| --- | --- | --- | --- |
| Geologic Material | n.a. | 100 | 200-300 mesh size (US) |
| Activated Carbon | n.a. | 60 | 20-40 mesh size (US) |
| Calcium Fluoride | $CaF_2$ | 7 | |
| Gold Ore | n.a. | 5 | powdered, optional | n.a. = not applicable

A U.S. standard mesh size of 20 corresponds to a maximum particle size of about 0.853 mm and a mesh size of 40 corresponds to a maximum particles size of about 0.422 mm.

Example 4

A method for recovering and refining gold from sintered material may include a liquid extraction with aqua regia. For sinters that may not contain litharge or significant amounts of lead, a 4:1 $HCl:HNO_3$ composition of aqua regia may be used to recover in excess of 95% of the gold content as determined by fire assay. Recovery may be performed by heating just below the boiling temperature in a covered vessel for greater than two hours with occasional stirring. Following heating, the aqua regia leach may be cooled to room temperature and vacuum filtered. The recovered filter residue may be washed with a volume of water approximately equal to the volume of the filtrate. The filter residue may then be dried and fire assayed. The filter residue may be treated with a second portion of aqua regia as above to recover any remaining gold. The washed filter residue may be discarded.

Urea may be added to the filtrate with stirring until bubbling, which indicates decomposition of $HNO_3$, is no longer observed. The filtrate may be passed through a filter a once more to remove any remaining residue. The resulting filtrate may be golden yellow in color. A colloidal gold suspension may be recovered through the addition of a hot, aqueous solution of concentrated sodium metabisulfite. The solution may be added with stirring to the filtrate to achieve a final concentration of at least 50 grams sodium metabisulfite per liter of filtrate. The suspension may settle for several hours to overnight and the gold recovered by vacuum filtration. The filtrate may be washed with water and dried. The resulting brown powder may have a gold content of up to 95% or more.

Example 5

A method for recovering and refining gold from sintered material may include a liquid extraction with sodium cyanide using standard methods known in the art. The use of sodium cyanide may result in a high yield recovery of gold in combination with the flux compositions described in Tables 1 and 4.

Example 6

A method for recovering and refining gold from sintered material including at least a potion of litharge or lead may be carried out as follows. In order to reduce the litharge to lead so that it may be formed into a gold-bearing lead anode bar it may first be smelted at about 1090° C. (2000° F.). The smelting process may include a flux composition as shown in Table 5.

TABLE 5

| Component | Chemical Formula | Parts | Details |
| --- | --- | --- | --- |
| Sinter Including Target Material | n.a. | 100 | |
| Activated Carbon | n.a. | 30 | 20-40 mesh size (US) |
| Sodium Carbonate | $Na_2CO_3$ | 20 | |
| Borax Powder | $Na_2B_4O_7 \cdot 5H_2O$ | 180 | | n.a. = not applicable

Using a silicon carbide crucible, the flux composition may be back charged into the crucible. In one aspect, this may reduce the possibility of the charge overflowing the crucible. The charge may then be smelted for about 1.5 to 2 hours at a temperature of about 1090° C. (2000° F.). The resulting smelt may be poured into a flat bottom cast iron mold to provide a suitable lead/gold plate that may be anode leached. The casting may be cooled and any slag may be removed from the lead bar, for example, with a small hammer.

One or more electrochemical tanks may be prepared to receive the cast bars. One possible electrolyte composition includes a 25% aqueous solution of lead fluoroborate. A DC rectifier may be configured to supply adequate amperage. During operation, the electrolyte may be slowly recirculated, such as with a peristaltic pump and acid resistant plastic tubing. The gold-bearing lead bar may be configured as the anode and a stainless steel plate as the cathode. In order to contain the gold slimes, an anode bag may be used with each lead bar in the electrochemical tank. The lead from the cathode may be scrapped off periodically and any lead in the bottom of the tank may be periodically removed by coarse filtration. The voltage in the tank may be maintained at about 3.5 volts DC. The resulting gold-bearing mud may be washed from the anode bag, dried, and smelted to a gold ore. Additional anode bars may be added to the electrochemical tanks and the anode leaching process continued. Remaining lead "heels" from the anode leaching may be added to the above smelting process and thus recycled.

Example 7

A system and method for recovering and refining gold from a sintered material may include determining the gold content by fire assay. In one aspect, each of the major steps in a system and method according to the present disclosure may be fire assayed for gold content.

One possible flux composition for use in a fire assay to determine either gold or silver content is shown in Table 6.

TABLE 6

| Component | Chemical Formula | Mass (g) |
| --- | --- | --- |
| Sample Including Target Material | n.a. | 5 |
| Litharge | PbO | 40 |
| Flour | n.a. | 2.5 |
| Sodium Carbonate | $Na_2CO_3$ | 30 |
| Borax Powder | $Na_2B_4O_7 \cdot 5H_2O$ | 15 |
| Silica | $SiO_2$ | 3 | n.a. = not applicable

The composition illustrated in Table 6 may be smelted using a 30 gram fire clay crucible at a temperature of 1038° C. (1900° F.) for a period of 1 hour. The melt may be poured into a cast iron mold and after cooling, the slag may be cleaned from the resulting lead button using, for example, a small hammer. The resulting lead button may be cupelled using a magnesite composition cupel at a temperature of 1010° C. (1850° F.). The resulting 'gold' prill may be weighed with a milligram scale and the prill evaluated for possible silver content. The gold content may be determined, for example, in units of Troy ounces per ton (TO/T) of the sample.

Example 8

Another example method for the recovery of a target material from a PTO material containing gold in a non-bulk state may include the use of urea and a surfactant. For washing of the PTO, a quantity of PTO material was processed to achieve a minimum U.S. standard mesh size of at least about 300 (i.e., a particle size of less than about 50 µm). The processed PTO was combined with tap water at a ratio of 1 liter of tap water per 50 grams of PTO material. The water and PTO were placed in an agitation system including a plastic tank with baffle plates. During agitation of the PTO material, a sufficient amount of NaOH, in the form of caustic soda micropearls, was added to the system as necessary to maintain a pH of between about 10.5 and about 11.5.

Following 1 hour of agitation, the solid fraction was allowed to settle for at least about 15 minutes. The settled slurry was filtered to recover the solid fraction, and the filtrate (liquid fraction) was discarded. To achieve nucleation and growth of the gold material within in the PTO, the remaining moist filter cake including the solid fraction was returned to the agitation system with a volume of tap water equal to the initial volume added to the PTO in the previous agitation step (i.e., 1 liter water per 50 g PTO). Under moderate agitation, urea was added to the system at a ratio of 10 grams of urea per liter of slurry. Following the addition of urea, agitation was continued for 1 hour and the pH was monitored. The pH of the slurry during nucleation and growth was between about 8 and about 9. Thereafter, a non-ionic surfactant was added to the still agitating slurry at a ratio of 1 ml Triton X-100 (DOW CHEMICAL) per liter slurry. Agitation was then continued for 4 hours followed by filtration of the solid fraction from the slurry. The resulting filter cake including the solid fraction was exposed to a "Blow-down" process, in which concentrated air is blown onto the filter cake to remove excess water until the filter cake is nearly dry.

For sintering, the moist solid fraction was added to fire clay saggars with a layer thickness of no more than about 25 mm to about 50 mm. The saggars were placed in a furnace programmed according to the method shown in Table 7.

TABLE 7

| Segment | Ramp Rate (° C./hr) | Hold Temp. (° C.) | Hold Time (min) |
|---|---|---|---|
| 0 | n.a. | R.T. | n/a |
| 1 | maximum | 260 | 60 |
| 2 | maximum | 680 | 60 |
| 3 | maximum | 1090 | 60 |
| 4 | n.a. | R.T. | n/a |

R.T. = room (ambient) temperature; n.a. = not applicable

Following completion of the program in Table 7, the saggars were removed from the furnace and allowed to cool. The sinter was recovered from the cooled saggars, coarse-ground, and weighed.

For metallization of the nucleated fraction of the precious metal, the coarse-ground sintered material was mechanically attrited (i.e., exposed to a shearing force) for between about 4 to about 8 hours as determined by assaying the attrited material on an hourly basis. When the amount of precious metal recovered from the attrited material reached a steady-state value, verified microscopically during the assay process that was repeated hourly, the attrition process was determined to be complete. Following attrition, the resulting material was tested for the ability to gravity concentrate. The attrited material was concentrated by washing the fines from the coarser metallic particles. The resulting attrited sinter was assayed using conventional methods as described herein.

Example 9

Another possible flux composition for use in performing a fire assay to determine either gold or silver content is shown in Table 8. In one aspect, the flux composition in Table 8 may be useful for the analysis of samples prepared with urea, a surfactant, or a combination thereof.

TABLE 8

| Component | Chemical Formula | Mass (g) |
|---|---|---|
| Sample Including Target Material | n.a. | 2 |
| Litharge | PbO | 40 |
| Flour | n.a. | 8 |
| Sodium Carbonate | $Na_2CO_3$ | 40 |
| Borax Powder | $Na_2B_4O_7 \cdot 5H_2O$ | 15 |
| Calcium Fluoride | $CaF_2$ | 2 |
| Silica | $SiO_2$ | 3 |
| Analytical Grade Silver Powder | Ag | 0.5 | n.a. = not applicable

The composition illustrated in Table 8 may be prepared a 30 gram fire clay crucible and placed in a furnace or kiln at a temperature of 500° C. (986° F.) for a period of 1 hour followed by a temperature ramp to 1093° C. (2000° F.). When the temperature of the furnace reaches 1093° C. (2000° F.), the melt may be poured from the crucible into a cast iron mold. After cooling, the slag may be cleaned from the resulting lead button using, for example, a small hammer. The resulting lead button may be cupelled using a magnesite composition cupel at a temperature of 1010° C. (1850° F.). The resulting 'gold' prill may be weighed with a milligram scale and the prill evaluated for possible silver content. The gold content may be determined, for example, in units of Troy ounces per ton (TO/T) of the sample.

In another aspect, following cupellation at 1010° C. (1850° F.), the resulting product may undergo a parting process to separate any gold present in the sample from any silver present in the sample. An acid parting process may involve the addition of the sample to a solution of 30% $HNO_3$ prepared with distilled water. The parting step may be carried out at low temperature (e.g., less than about 95° C.). Material resulting from the parting process (i.e., partings) may be washed with distilled water and annealed at a temperature of about 600-675° C. The annealed material may then be weighed or otherwise analyzed to determine the gold content. A further step may include regrinding the slag to a fine powder. The ground slag may be refired or panned.

In the above example, it may be useful to include the initial step of holding the crucible at a temperature of 500° C. (986° F.) for a period of 1 hour to facilitate the reduction of the litharge (PbO) to lead (Pb) in the presence of flour (reductant) while the melt is still relatively viscous. In doing so, the small globules of Pb/PbO may have a better chance of reacting with the very small particles of nucleated gold. Further discussion of this phenomenon may be found here: Lashley, W. (1985).

*Fundamentals of Fire Assaying (an introduction to Slagmaster).* p. 4, Bul. 113084A, American Society for Applied Technology.

The present invention has been described in terms of one or more preferred embodiments, and it should be appreciated that many equivalents, alternatives, variations, and modifications, aside from those expressly stated, are possible and within the scope of the invention.

Each reference identified in the present application is herein incorporated by reference in its entirety.

While present inventive concepts have been described with reference to particular embodiments, those of ordinary skill in the art will appreciate that various substitutions and/or other alterations may be made to the embodiments without departing from the spirit of present inventive concepts. Accordingly, the foregoing description is meant to be exemplary, and does not limit the scope of present inventive concepts.

A number of examples have been described herein. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the present inventive concepts.

What is claimed is:

1. A method for recovering a precious metal from a geologic material, the method comprising the steps of:
    (a) forming a slurry including:
        (i) a geologic material including at least one precious metal, the at least one precious metal being present in a non-bulk state,
        (ii) a surfactant, and
        (iii) urea;
    (b) agitating the slurry;
    (c) recovering a solid fraction from the agitated slurry; and
    (d) sintering the solid fraction according to a first sintering profile that causes a portion of the at least one precious metal to agglomerate within the solid fraction into a bulk state of the at least one precious metal, the at least one precious metal having in the bulk state a greater weight percent of the solid fraction than the at least one precious metal had prior to sintering the solid fraction.

2. The method of claim 1, wherein the at least one precious metal is selected from gold, silver and platinum group metals.

3. The method of claim 1, wherein a portion of the at least one precious metal is present as atomic clusters bonded to amorphous colloidal silica.

4. The method of claim 3, wherein the composition of the slurry and the first sintering profile are selected to separate the atomic clusters from the amorphous colloidal silica.

5. The method of claim 1, wherein the geologic material is selected from mine tailings and coal combustion products.

6. The method of claim 1, wherein the urea is added to the slurry to provide a final concentration of about 1 gram per liter to 100 grams per liter.

7. The method of claim 1, wherein the surfactant is added to the slurry to a final concentration of about 0.01% to about 1% on a volume per volume basis.

8. The method of claim 1, wherein the slurry comprises about 50 g of the geologic material per 1 liter of water.

9. The method of claim 1, further comprising washing the geologic material prior to forming the slurry.

10. The method of claim 1, wherein the surfactant is polyethylene glycol p-(1,1,3,3-tetramethylbutyl)-phenyl ether.

11. A method for recovering a precious metal from a geologic material, the method comprising the steps of:
    (a) forming a slurry including:
        (i) a geologic material including at least one precious metal, the at least one precious metal being present in a non-bulk state, and
        (ii) a surfactant;
    (b) agitating the slurry;
    (c) recovering a solid fraction from the agitated slurry; and
    (d) sintering the solid fraction according to a first sintering profile that causes a portion of the at least one precious metal to agglomerate within the solid fraction into a bulk state of the at least one precious metal, the at least one precious metal having in the bulk state a greater weight percent of the solid fraction than the at least one precious metal had prior to sintering the solid fraction, wherein the first sintering profile includes a first period of time at a first temperature and a second period of time at a second temperature, wherein the second temperature is greater than the first temperature.

12. The method of claim 11, wherein the first temperature is at least about 260 degrees Celsius, and wherein the second temperature is at least about 680 degrees Celsius.

13. A method for recovering gold from a geologic material, the method comprising the steps of:
    (a) combining into a first slurry:
        (i) a geologic material including gold present in a non-bulk state, and
        (ii) about 1 liter of water per 50 grams of the geologic material;
    (b) agitating the first slurry;
    (c) recovering a first solid fraction from the first slurry;
    (d) combining into a second slurry:
        (i) the first solid fraction,
        (ii) about 1 liter of water per 50 g of the geologic material,
        (iii) about 1 gram per liter to about 100 grams per liter of urea, and
        (iv) about 0.01% to about 1% of a non-ionic surfactant on a volume per volume basis;
    (e) agitating the second slurry;
    (f) recovering a second solid fraction from the second slurry;
    (g) sintering the second solid fraction for a first period of time at a first temperature, a second period of time at a second temperature, and a third period of time at a third temperature, wherein the second temperature is greater than the first temperature, and the third temperature is greater than the second temperature; and
    (h) recovering a sintered material including at least about 0.15 weight percent of gold metal in a bulk state.

14. The method of claim 13, wherein the geologic material is selected from mine tailings and coal combustion products.

15. The method of claim 13, wherein the second slurry comprises about 10 grams per liter of urea.

16. The method of claim 13, wherein the second slurry comprises about 0.1% of the surfactant on a volume per volume basis.

17. The method of claim 13, wherein the first temperature is at least about 260 degrees Celsius, wherein the second temperature is at least about 680 degrees Celsius, and wherein the third temperature is at least about 1090 degrees Celsius.

18. The method of claim 13, wherein the surfactant is polyethylene glycol p-(1,1,3,3-tetramethylbutyl)-phenyl ether.

19. The method of claim 13, further comprising a step of mechanically attriting the sintered material.

\* \* \* \* \*